United States Patent
Seok

(10) Patent No.: US 10,320,537 B2
(45) Date of Patent: *Jun. 11, 2019

(54) DOWNLINK PHYSICAL LAYER PROTOCOL DATA UNIT FORMAT IN A HIGH EFFICIENCY WIRELESS LAN

(71) Applicant: NEWRACOM, INC., Irvine, CA (US)

(72) Inventor: Yongho Seok, Irvine, CA (US)

(73) Assignee: NEWRACOM, INC., Lake Forest, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/811,663

(22) Filed: Nov. 13, 2017

(65) Prior Publication Data

US 2018/0109362 A1    Apr. 19, 2018

Related U.S. Application Data

(63) Continuation of application No. 14/790,878, filed on Jul. 2, 2015, now Pat. No. 9,819,460.

(30) Foreign Application Priority Data

Jul. 4, 2014   (KR) .................. 10-2014-0083889
Jul. 14, 2014  (KR) .................. 10-2014-0088362

(51) Int. Cl.
| | |
|---|---|
| *H04L 5/00* | (2006.01) |
| *H04W 72/04* | (2009.01) |
| *H04L 27/26* | (2006.01) |
| *H04W 84/12* | (2009.01) |
| *H04W 88/08* | (2009.01) |
| *H04B 7/0452* | (2017.01) |

(52) U.S. Cl.
CPC ............ *H04L 5/003* (2013.01); *H04B 7/0452* (2013.01); *H04L 5/0007* (2013.01); *H04L 27/2601* (2013.01); *H04L 27/2602* (2013.01); *H04W 72/0413* (2013.01); *H04W 72/0446* (2013.01); *H04L 5/0037* (2013.01); *H04L 5/0048* (2013.01); *H04W 84/12* (2013.01); *H04W 88/08* (2013.01)

(58) Field of Classification Search
None
See application file for complete search history.

(56) References Cited

U.S. PATENT DOCUMENTS

2015/0146653 A1* 5/2015 Zhang ................... H04L 5/0041
                                                            370/329

OTHER PUBLICATIONS

Zhang et al., OFDMA for WLAN: PHY Formats (U.S. Appl. No. 61/909,616), filed Nov. 2013 (Year: 2013).*

* cited by examiner

*Primary Examiner* — George C Atkins

(57) ABSTRACT

The present invention provides a new downlink frame format to support MU-MIMO and OFDMA, and methods, apparatuses, etc. therefor. In an aspect of the present invention, a method for transmitting data to a plurality of STAs by an AP in a WLAN may include generating a HE-LTF field for the plurality of STAs, and transmitting a PPDU frame to the plurality of STAs, the PPDU frame including the HE-LTF field and data for the plurality of STAs. The data for the plurality of STAs may be transmitted to different STA on each of a plurality of subchannels, and a starting point of the HE-LTF field may be same across the plurality of STAs and an end point of the HE-LTF field may be same across the plurality of STAs.

19 Claims, 17 Drawing Sheets

FIG. 10

| L-STF | L-LTF | L-SIG | HE-SIG-A | HE-STF | HE-LTF | HE-LTF | HE-LTF | HE-LTF | HE-SIG-B | PSDU(AP to STA6) |
|---|---|---|---|---|---|---|---|---|---|---|
| | | | | HE-STF | HE-LTF | HE-LTF | HE-LTF | HE-LTF | HE-SIG-B | PSDU(AP to STA5) |
| | | | | HE-STF | HE-LTF | HE-LTF | HE-LTF | HE-LTF | HE-SIG-B | PSDU(AP to STA3, STA4) |
| | | | | HE-STF | HE-LTF | HE-LTF | HE-LTF | HE-LTF | HE-SIG-B | PSDU(AP to STA1, STA2) |

FIG. 11

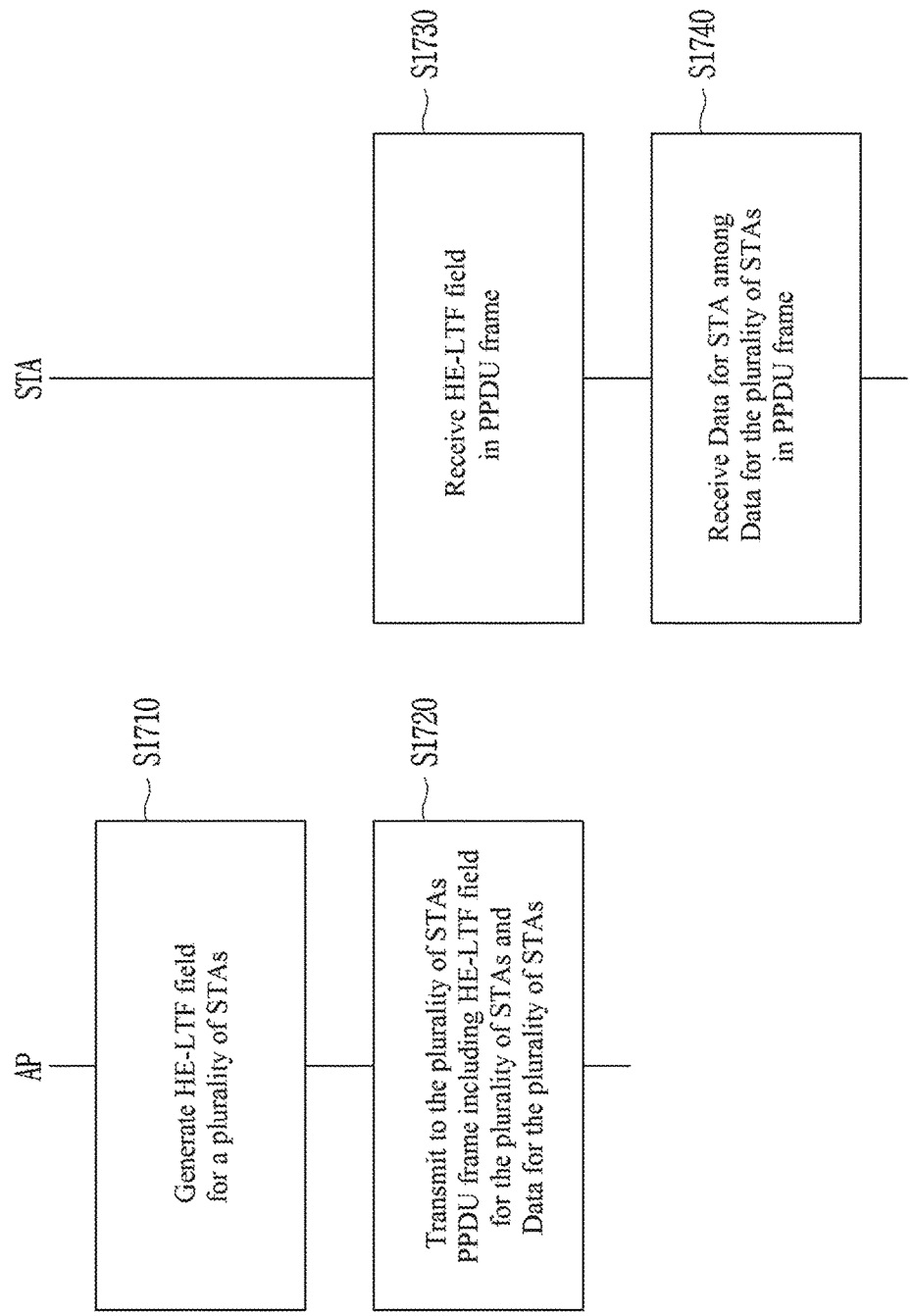

DOWNLINK PHYSICAL LAYER PROTOCOL DATA UNIT FORMAT IN A HIGH EFFICIENCY WIRELESS LAN

This application is a continuation of U.S. patent application Ser. No. 14/790,878, filed on Jul. 2, 2015, which claims the benefit of Korean Patent Application No. 10-2014-0083889, filed on Jul. 4, 2014, and Korean Patent Application No. 10-2014-0088362, filed on Jul. 14, 2014, which are hereby incorporated by reference as if fully set forth herein.

BACKGROUND OF THE INVENTION

Field of the Invention

The present invention relates to a Wireless Local Area Network (WLAN), and more particularly, to a DownLink (DL) Physical layer Protocol Data Unit (PPDU) format for a High Efficiency WLAN (HEW), a transmission method, reception method, transmission apparatus, reception apparatus, and software using the DL PPDU format, and a recording medium that stores the software.

Discussion of the Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

SUMMARY OF THE INVENTION

Objects of the present invention is to provide a new DownLink (DL) Physical layer Protocol Data Unit (PPDU) frame format for simultaneous transmission from one Access Point (AP) to a plurality of Stations (STAs) and to support Multi-User Multiple Input Multiple Output (MU-MIMO) and Orthogonal Frequency Division Multiple Access (OFDMA) using the PPDU frame format.

The objects of the present invention are not limited to the foregoing descriptions, and additional objects will become apparent to those having ordinary skill in the pertinent art to the present invention based upon the following descriptions.

In an aspect of the present invention, a method for transmitting data to a plurality of Stations (STAs) by an Access Point (AP) in a Wireless Local Area Network (WLAN) is provided. The method may include generating a High Efficiency-Long Training Field (HE-LTF) field for the plurality of STAs, and transmitting a Physical layer Protocol Data Unit (PPDU) frame to the plurality of STAs, the PPDU frame including the HE-LTF field and data for the plurality of STAs. The data for the plurality of STAs may be transmitted to different STA on each of a plurality of subchannels, and a starting point of the HE-LTF field may be same across the plurality of STAs and an end point of the HE-LTF field may be same across the plurality of STAs.

In another aspect of the present invention, a method for receiving data from an AP by a STA of a plurality of STAs in a WLAN is provided. The method includes receiving a HE-LTF field in a PPDU frame, and receiving data for the STA from among data for the plurality of STAs in the PPDU frame. The data for the plurality of STAs may be transmitted to different STA on each of a plurality of subchannels, and a starting point of the HE-LTF field may be same across the plurality of STAs and an end point of the HE-LTF field may be same across the plurality of STAs.

In another aspect of the present invention, an AP apparatus for transmitting data to a plurality of STAs by an AP in a WLAN is provided. The AP apparatus may include a baseband processor, a Radio Frequency (RF) transceiver, and a memory, etc. The baseband processor may be configured to generate a HE-LTF field for the plurality of STAs, and to transmit a PPDU frame to the plurality of STAs using the RF transceiver, the PPDU frame including the HE-LTF field and data for the plurality of STAs. The data for the plurality of STAs may be transmitted to different STA on each of a plurality of subchannels, and a starting point of the HE-LTF field may be same across the plurality of STAs and an end point of the HE-LTF field may be same across the plurality of STAs.

In another aspect of the present invention, a Station (STA) apparatus of a plurality of STAs for receiving data from an Access Point (AP) in a Wireless Local Area Network (WLAN) is provided. The STA apparatus may include a baseband processor, an RF transceiver, and a memory, etc. The baseband processor may be configured to receive a HE-LTF field in a PPDU frame using the RF transceiver, and to receive data for the STA from among data for the plurality of STAs in the PPDU frame using the RF transceiver. The data for the plurality of STAs may be transmitted to different STA on each of a plurality of subchannels, and a starting point of the HE-LTF field may be same across the plurality of STAs and an end point of the HE-LTF field may be same across the plurality of STAs.

In another aspect of the present invention, a software or a computer-readable medium having executable instructions for transmitting data to a plurality of STAs by an AP in a WLAN is provided. The executable instructions may cause the AP to generate a HE-LTF field for the plurality of STAs, and to transmit a PPDU frame to the plurality of STAs, the PPDU frame including the HE-LTF field and data for the plurality of STAs. The data for the plurality of STAs may be transmitted to different STA on each of a plurality of subchannels, and a starting point of the HE-LTF field may be same across the plurality of STAs and an end point of the HE-LTF field may be same across the plurality of STAs.

In another aspect of the present invention, a software or a computer-readable medium having executable instructions for receiving data from an AP by a STA of a plurality of STAs in a WLAN is provided. The executable instructions may cause the STA to receive a HE-LTF field in a PPDU frame using the RF transceiver and to receive data for the STA from among data for the plurality of STAs in the PPDU frame using the RF transceiver. The data for the plurality of STAs may be transmitted to different STA on each of a plurality of subchannels, and a starting point of the HE-LTF field may be same across the plurality of STAs and an end point of the HE-LTF field may be same across the plurality of STAs.

With respect to the above aspects of the present invention, the HE-LTF field may include a plurality of HE-LTF sections in a frequency domain, and a number of HE-LTF elements included in each of the HE-LTF sections may be equal across the plurality of STAs.

With respect to the above aspects of the present invention, if a different number of spatial streams are transmitted on each of the subchannels, or irrespective of the number of spatial streams transmitted on each of the subchannels, the number of HE-LTF elements may be equal across the plurality of subchannels.

With respect to the above aspects of the present invention, the number of HE-LTF elements may be determined according to the maximum of the numbers of spatial streams transmitted on the plurality of subchannels.

With respect to the above aspects of the present invention, if a different number of spatial streams are transmitted on each of the subchannels, or irrespective of the number of spatial streams transmitted on each of the subchannels, a starting point of the HE-LTF section for each of the plurality of subchannels may be equal across the plurality of subchannels and an end point of the HE-LTF section for each of the plurality of subchannels may be equal across the plurality of subchannels.

With respect to the above aspects of the present invention, if each of the plurality of subchannels includes a plurality of HE-LTF elements, the plurality of HE-LTF elements may be contiguous in a time domain.

With respect to the above aspects of the present invention, if the PPDU frame is transmitted in a Multi User-Multiple Input Multiple Output (MIMO) mode or an Orthogonal Frequency Division Multiple Access (OFDMA) mode, a starting point of the HE-LTF section for each of the plurality of subchannels may be equal across the plurality of subchannels and an end point of the HE-LTF section for each of the plurality of subchannels may be equal across the plurality of subchannels.

With respect to the above aspects of the present invention, Orthogonal Frequency Division Multiplexing (OFDM) symbol duration applied to the HE-LTF sections of each of the plurality of subchannels may be equal across the plurality of subchannels, and Guard Interval (GI) applied to the HE-LTF sections of each of the plurality of subchannels may be equal across the plurality of subchannels.

With respect to the above aspects of the present invention, the plurality of subchannels may be defined on one or more channels.

With respect to the above aspects of the present invention, one subchannel may be allocated without crossing a boundary between a plurality of channels.

It is to be understood that both the foregoing summarized features are exemplary aspects of the following detailed description of the present invention without limiting the scope of the present invention.

According to the present invention, a new DownLink (DL) Physical layer Protocol Data Unit (PPDU) format for simultaneous transmission from one Access Point (AP) to a plurality of Stations (STAs) is provided, and Multi-User Multiple Input Multiple Output (MU-MIMO) and Orthogonal Frequency Division Multiple Access (OFDMA) is supported using the PPDU format.

The advantages of the present invention are not limited to the foregoing descriptions, and additional advantages will become apparent to those having ordinary skill in the pertinent art to the present invention based upon the following descriptions.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 depicts the starting and ending points of an High Efficiency Long Training Field (HE-LTF) field in a HE PPDU frame format according to the present invention;

FIG. 11 depicts a High Efficiency SIGnal B (HE-SIG-B) field and a High Efficiency SIGnal C (HE-SIG-C) field in the HE PPDU frame format according to the present invention;

FIG. 17 is a flowchart illustrating an exemplary method according to the present invention.

DETAILED DESCRIPTION OF THE INVENTION

Figure 1:
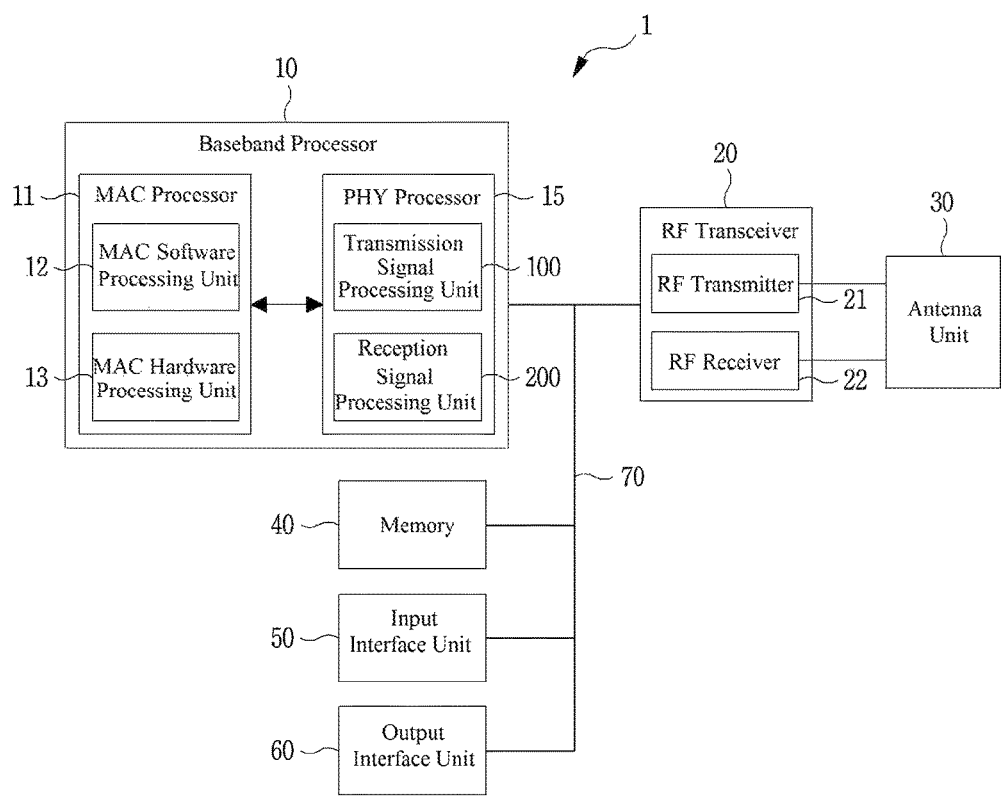
FIG. 1 is a block diagram of a Wireless Local Area Network (WLAN) device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a PHYsical (PHY) layer in conformance to Institute of Electrical and Electronics Engineers (IEEE)

802.11 series standards. At least one of the WLAN devices may be an Access Point (AP) and the other WLAN devices may be non-AP Stations (non-AP STAs). Alternatively, all of the WLAN devices may be non-AP STAs in an ad-hoc network. Generally, the term STA covers AP STA and non-AP STA. However, only a non-AP STA may be referred to as a STA, for the convenience's sake.

WLAN Device

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present invention, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, the MAC processor 11 is not limited to the foregoing implementation examples.

The PHY processor 15 includes a transmission signal processing unit 100 and a reception signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
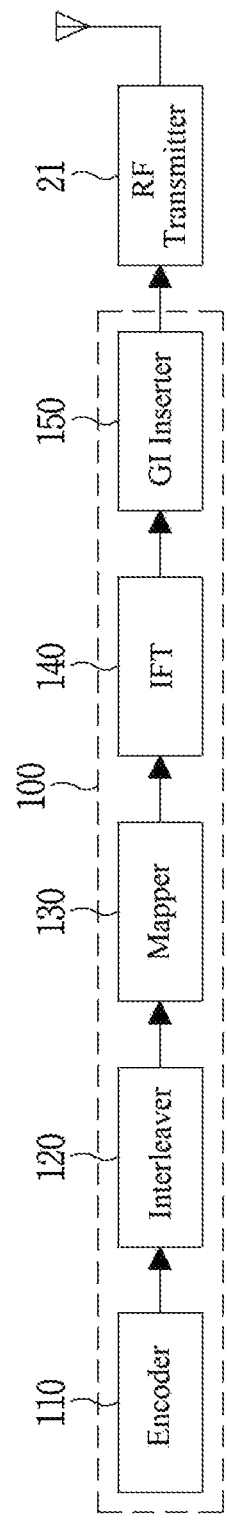
FIG. 2 is a schematic block diagram of an exemplary transmission signal processing unit in a WLAN.

FIG. 2 is a schematic block diagram of an exemplary transmission signal processor in a WLAN.

Referring to FIG. 2, the transmission signal processing unit 100 includes an encoder 110, an interlaever 120, a mapper 130, an Inverse Fourier Transform (IFT) processor 140, and a Guard Interval (GI) inserter 150.

The encoder 110 encodes input data. For example, the encoder 100 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmission signal processing unit 100 may further include a scrambler for scrambling input data before encoding to reduce the probability of long sequences of 0s or 1s. If a BCC encoding scheme is used in the encoder 110, the transmission signal processing unit 100 may further include an encoder parser for demultiplexing the scrambled bits among a plurality of BCC encoders. If an LDPC encoding scheme is used in the encoder 110, the transmission signal processing unit 100 may not use the encoder parser.

The interleaver 120 interleaves the bits of each stream output from the encoder 110 to change orders of bits. Interleaving may be applied only when a BCC encoding scheme is used in the encoder 110. The mapper 130 maps a sequence of bits output from the interleaver 120 to constellation points. If an LDPC encoding scheme is used in the encoder 110, the mapper 130 may further perform LDPC tone mapping besides the constellation point mapping.

In MIMO or MU-MIMO, the transmission signal processing unit 100 may use as many interleavers 120 as and as many mappers 130 as the number $N_{SS}$ of spatial streams. In this case, the transmission signal processing unit 100 may further include a stream parser for dividing the outputs of the BCC encoders or the output of the LDPC encoder into a plurality of blocks to be provided to the different interleavers 120 or mappers 130. The transmission signal processing unit 100 may further include a Space-Time Block Code (STBC) encoder for spreading the constellation points from $N_{SS}$ spatial streams into $N_{STS}$ space-time streams and a spatial mapper for mapping the space-time streams to transmit chains. The spatial mapper may use direct mapping, spatial expansion, or beamforming.

The IFT processor 140 converts a block of constellation points output from the mapper 130 or the spatial mapper to a time-domain block (i.e., a symbol) by Inverse Discrete Fourier Transform (IDFT) or Inverse Fast Fourier Transform (IFFT). If the STBC encoder and the spatial mapper are used, the IFT processor 140 may be provided for each transmit chain.

In MIMO or MU-MIMO, the transmission signal processing unit 100 may insert Cyclic Shift Diversities (CSDs) in order to prevent unintended beamforming. A CSD insertion may applied before or after IFT. A CSD may be specified for each transmit chain or for each space-time stream. Alternatively, the CSD may be applied as a part of the spatial mapper.

In MU-MIMO, some blocks before the spatial mapper may be provided for each user.

The GI inserter 150 prepends a GI to a symbol. The transmission signal processing unit 100 may optionally perform windowing to smooth edges of each symbol after inserting the GI. The RF transmitter 21 converts the symbols into an RF signal and transmits the RF signal via the antenna unit 30. In MIMO or MU-MIMO, the GI inserter 150 and the RF transmitter 21 may be provided for each transmit chain.

Figure 3:
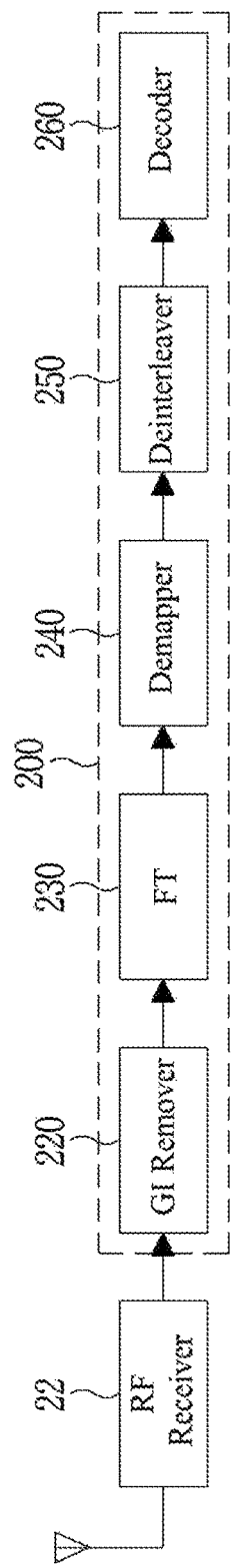
FIG. 3 is a schematic block diagram of an exemplary reception signal processing unit in a WLAN.

FIG. 3 is a schematic block diagram of an exemplary a reception signal processor in a WLAN.

Referring to FIG. 3, the reception signal processing unit 200 includes a GI remover 220, a Fourier Transform (FT) processor 230, a demapper 240, a deinterleaver 250, and a decoder 260.

The RF receiver 22 receives an RF signal via the antenna unit 30 and converts the RF signal into symbols. The GI remover 220 removes a GI from the symbols. In MIMO or MU-MIMO, the RF receiver 22 and the GI remover 220 may be provided for each receive chain.

The FT 230 converts the symbol (i.e., the time-domain block) into a block of constellation points by Discrete Fourier Transform (DFT) or Fast Fourier Transform (FFT). The FT processor 230 may be provided for each receive chain.

In MIMO or MU-MIMO, the reception signal processing unit 200 may include a spatial demapper for converting Fourier Transformed receiver chains to constellation points of space-time streams, and an STBC decoder for despreading the constellation points from the space-time streams into the spatial streams.

The demapper 240 demaps constellation points output from the FT processor 230 or the STBC decoder to bit streams. If an LDPC encoding scheme has been applied to the received signal, the demapper 240 may further perform LDPC tone demapping before the constellation demapping. The deinterleaver 250 deinterleaves the bits of each of the streams output from the demapper 240. Deinterleaving may be applied only when a BCC endocing scheme has been applied to the received signal.

In MIMO or MU-MIMO, the reception signal processing unit 200 may use as many demappers 240 as and as many deinterleavers 250 as the number of spatial streams. In this case, the reception signal processing unit 200 may further include a stream deparser for combining streams output from the deinterleavers 250.

The decoder 260 decodes streams output from the deinterleaver 250 or the stream deparser. For example, the decoder 100 may be an FEC decoder. The FEC decoder may include a BCC decoder or an LDPC decoder. The reception signal processing unit 200 may further include a descrambler for descrambling the decoded data. If a BCC decoding scheme is used in the decoder 260, the reception signal processing unit 200 may further include an encoder deparser for multiplexing data decoded by a plurality of BCC decoders. If an LDPC decoding scheme is used in the decoder 260, the reception signal processing unit 200 may not use the encoder deparser.

WLAN Access Mechanism

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
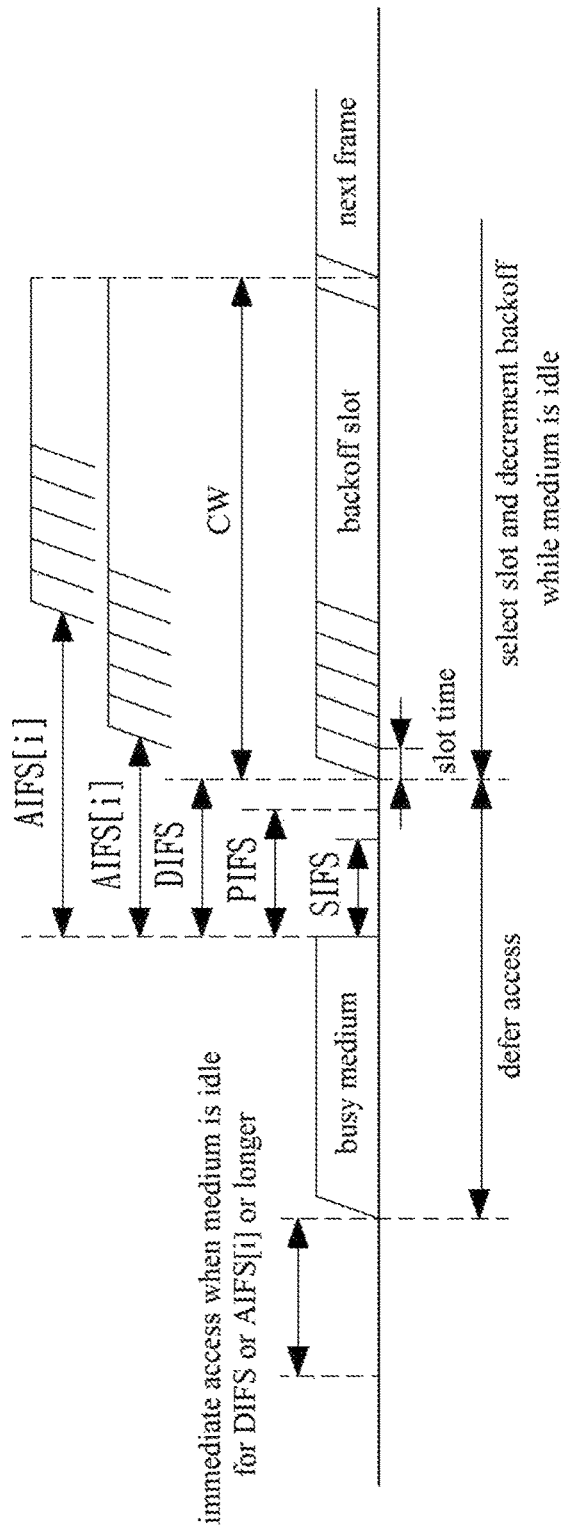
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data to be forwarded to a higher layer. After a Distributed Coordination Function IFS (DIFS) from a time when a medium gets idle, a WLAN device performs a backoff and then transmits a data frame. A management frame is used for exchanging management information which is not forwarded to the higher layer. After an IFS such as the DIFS or a Point Coordination Function IFS (PIFS), the WLAN device transmits the management frame. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. If the control frame is not a response frame to another frame, the WLAN device performs a backoff after the DIFS and then transmits the control frame; or if the control frame is a response frame to another frame, the WLAN device transmits the control frame after a Short IFS (SIFS) without a backoff. The type and subtype of a frame may be identified by a type field and a subtype field in a Frame Control (FC) field.

On the other hand, a Quality of Service (QoS) STA may perform a backoff after an Arbitration IFS (AIFS) for Access Category (AC), i.e., AIFS[i] (i is determined based on AC) and then transmit a frame. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
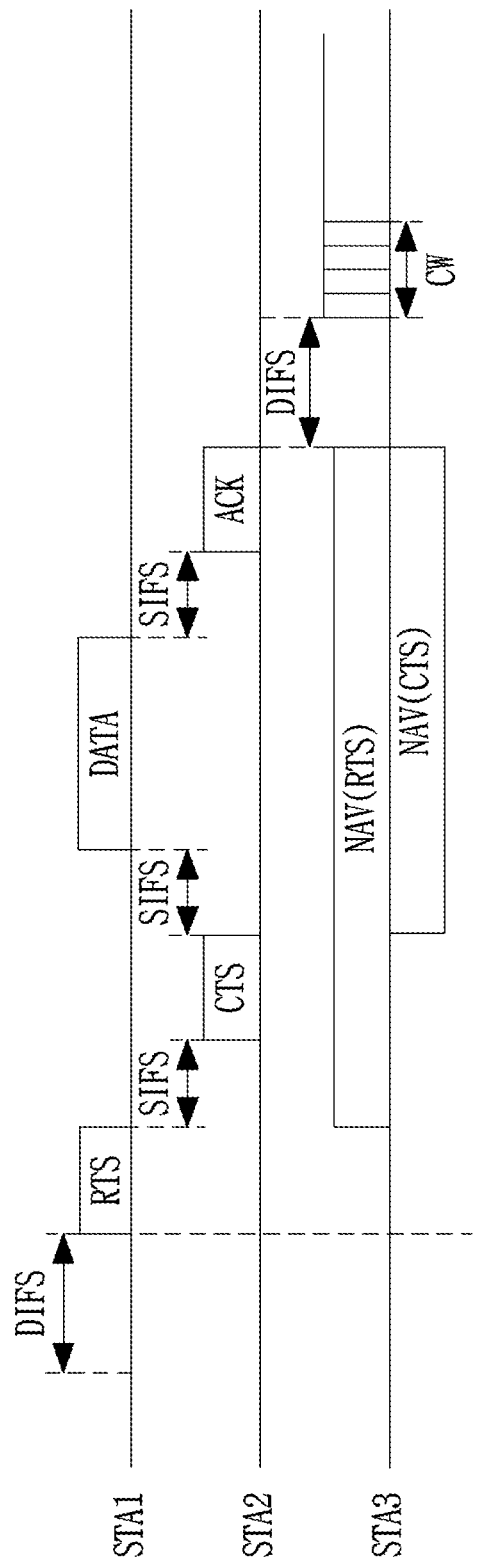
FIG. 5 is a conceptual diagram illustrating a procedure for transmitting a frame in Carrier Sense Multiple Access with Collision Avoidance (CSMA/CA) to avoid collision between frames on a channel.

FIG. 5 is a conceptual diagram illustrating a CSMA/CA-based frame transmission procedure to avoid collision between frames on a channel.

Referring FIG. 5, a first STA (STA1) is a transmitting WLAN device having data to be transmitted, a second STA (STA2) is a receiving WLAN device to receive the data from STA1, and a third STA (STA3) is a WLAN device located in an area where STA3 may receive a frame from STA1 and/or STA2.

STA1 may determine whether a channel is busy by carrier sensing. STA1 may determine channel occupancy based on an energy level of the channel or a correlation between signals on the channel, or using a Network Allocation Vector (NAV) timer.

If STA1 determines that the channel is not used by other devices during a DIFS (that is, the channel is idle), STA1 may transmit an RTS frame to STA2 after performing a backoff. Upon receipt of the RTS frame, STA2 may transmit a CTS frame as a response to the CTS frame after a SIFS.

Upon receipt of the RTS frame, STA3 may set a NAV timer for a transmission duration of following frames (e.g., a SIFS time+a CTS frame duration+a SIFS time+a data frame duration+a SIFS time+an ACK frame duration), based on duration information included in the RTS frame. Upon receipt of the CTS frame, STA3 may set the NAV timer for a transmission duration of following frames (e.g., a SIFS time+a data frame duration+a SIFS time+an ACK frame duration), based on duration information included in the CTS frame. Upon receipt of a new frame before the NAV timer expires, STA3 may update the NAV timer based on duration information included in the new frame. STA3 does not attempt to access the channel until the NAV timer expires.

Upon receipt of the CTS frame from STA2, STA1 may transmit a data frame to STA2 a SIFS after the CTS frame has been completely received. Upon successful receipt of the data frame from STA1, STA2 may transmit an ACK frame as a response to the data frame after a SIFS.

Upon expiration of the NAV timer, STA3 may determine whether the channel is busy by carrier sensing. If STA3 determines that the channel is not in use by the other devices during a DIFS after expiration of the NAV timer, STA3 may attempt channel access after a convention window according a random backoff-based CW.

WLAN Frame Structure

Figure 6:
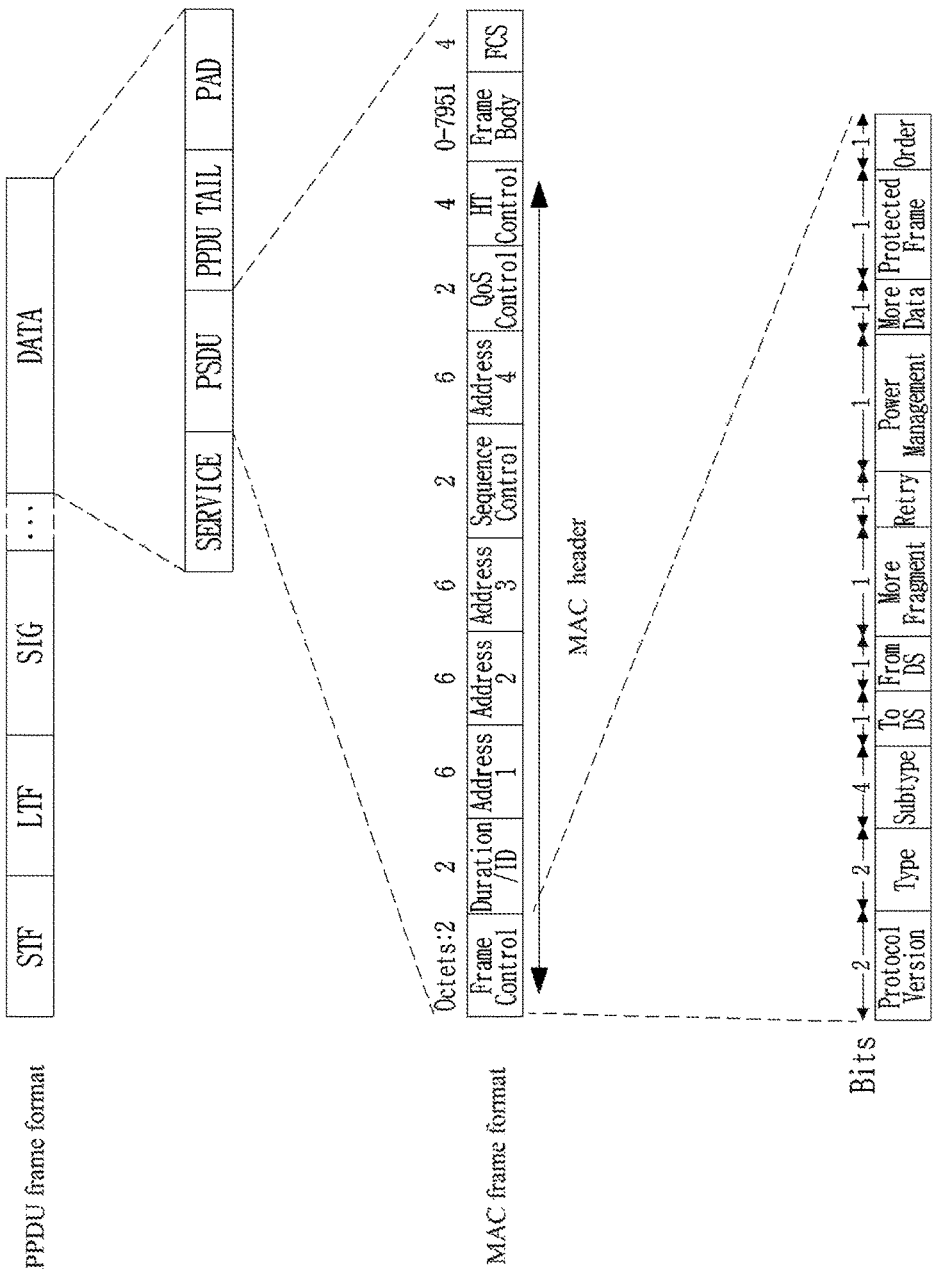
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

WLAN Frame Structure Supporting MU-MIMO and OFDMA

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present invention provides a new PPDU frame format for the IEEE 802.11ax HEW system. The new PPDU frame format may support MU-MIMO and OFDMA. A PPDU of the new format may be referred to as a 'HEW PPDU' or 'HE PPDU' (similarly, HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
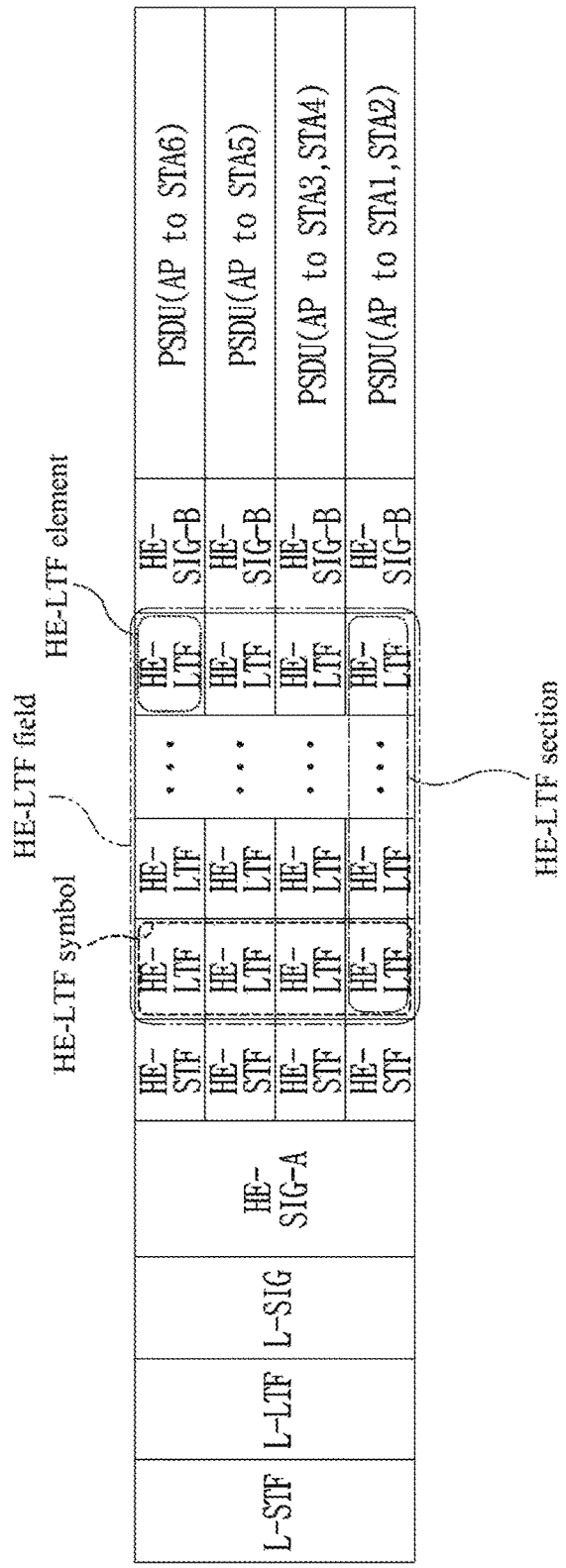
FIG. 7 depicts an exemplary High Efficiency (HE) Physical layer Protocol Data Unit (PPDU) frame format according to the present invention.

FIG. 7 depicts an exemplary HE PPDU frame format according to the present invention.

Referring to FIG. 7, the vertical axis represents frequency and the horizontal axis represents time. It is assumed that frequency and time increase in the upward direction and the right direction, respectively.

In the example of FIG. 7, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 7, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) or subband. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 7, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements should be understood as logical units and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., setting a NAV based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11ac stations, as listed in [Table 1] below, to ensure backward compatibility with legacy STAs (e.g., IEEE 802.11ac stations).

TABLE 1

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU:<br>Set to 1 if space time block coding is used and set to 0 otherwise.<br>For a VHT MU PPDU:<br>Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows:<br>Set to 0 for 0 space-time streams<br>Set to 1 for 1 space-time stream<br>Set to 2 for 2 space-time streams<br>Set to 3 for 3 space-time streams<br>Set to 4 for 4 space-time streams<br>Values 5-7 are reserved<br>For a VHT SU PPDU:<br>B10-B12<br>Set to 0 for 1 space-time stream<br>Set to 1 for 2 space-time streams<br>Set to 2 for 3 space-time streams<br>Set to 3 for 4 space-time streams<br>Set to 4 for 5 space-time streams<br>Set to 5 for 6 space-time streams<br>Set to 6 for 7 space-time streams<br>Set to 7 for 8 space-time streams<br>B13-B21<br>Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. |

TABLE 1-continued

| Two parts of VHT-SIG-A | Bit | Field | Number of bits | Description |
|---|---|---|---|---|
| | | | | The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU: VHT-MCS index For a VHT MU PPDU: If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1. If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1. If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1. B7 is reserved and set to 1 |
| | B8 | Beamformed | 1 | For a VHT SU PPDU: Set to 1 if a Beamforming steering matrix is applied to the waveform in an SU transmission as described in 20.3.11.11.2, set to 0 otherwise. For a VHT MU PPDU: Reserved and set to 1 NOTE-If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

[Table 1] illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification. In the HE PPDU frame format of the present invention, the HE-SIG-A field may include one or more of the fields included in the VHT-SIG-A field, and it may provide backward compatibility with IEEE 802.11ac stations.

The HE PPDU frame format of the present invention may further include information about a subchannel allocated to each HE STA in the HE-SIG-A field in order to support MU-MIMO and OFDMA. For example, the information about the subchannel allocated to the HE STA may include a Group ID and bandwidth information $N_{BW}$. The Group ID and $N_{BW}$ may be included in the HE-SIG-A field.

When a HE STA associates with a HE AP, the HE AP may allocate a Group ID to the HE STA. Each Group ID may be mapped to STA Position information. [Table 2] below illustrates an exemplary mapping relationship between Group IDs and STA Positions.

TABLE 2

| Group ID | Group ID 1 | Group ID 2 | ... | Group ID 61 | Group ID 62 |
|---|---|---|---|---|---|
| STA Position | 1 | 2 | ... | 4 | 1 |

In the example of [Table 2], STA Position 1 is allocated to Group ID 1 and STA Position 2 is allocated to Group ID 2, . . . , STA Position 4 is allocated to Group ID 61 and STA Position 1 is allocated to Group ID 62. In this manner, one or more Group IDs may be mapped to each STA Position. The HE STA that has received table information about the mapping relationship between Group IDs and STA Positions, upon receipt of a HE PPDU, may determine subchannel information allocated to it based on a Group ID and $N_{BW}$ included in the HE-SIG-A field of the HE PPDU.

A Group ID identifies a group to which a HE STA has been allocated. In the example of [Table 2], the Group ID may be 6 bits to indicate one of 1 to 62.

$N_{BW}$ indicates subchannel bandwidths allocated to HE STAs, corresponding to STA Position 1, STA Position 2, STA Position 3, and STA Position 4. $N_{BW}$ includes first 3 bits indicating a subchannel bandwidth for a HE STA corresponding to STA Position 1, second 3 bits indicating a subchannel bandwidth for a HE STA corresponding to STA Position 2, third 3 bits indicating a subchannel bandwidth for a HE STA corresponding to STA Position 3, and fourth 3 bits indicating a subchannel bandwidth for a HE STA corresponding to STA Position 4. In other words, $N_{BW}$ is configured to have 12 bits to represent subchannel bandwidths for four STA positions. If a BSS of the HE AP supports transmission of HE PPDUs of 5-MHz, 10-MHz, 20-MHz, 40-MHz, 80-MHz, and 160-MHz, $N_{BW}$ may be encoded in such a manner that the values of 3 bit information of $N_{BW}$, b000, b001, b010, b011, b100, b101, and b110 may indicate 0, 5, 10, 20, 40, 80, and 160 MHz, respectively. However, this is purely exemplary, and $N_{BW}$ may be encoded in any other coding scheme to indicate subchannel bandwidths.

For example, if the Group ID is 61 and $N_{BW}$ is b000, b001, b001, and b010 in the HE SIG-A field of the received HE PPDU, the HE STA may determine that Group ID 61 allocated to the HE STA in [Table 2] corresponds to STA Position 4 and the bandwidth of a subchannel allocated to the HE STA is 10 MHz based on b010 set in the fourth 3-bit information of $N_{BW}$.

If Group ID 61 is mapped to STA Position 1 unlike [Table 2], the HE STA may determine that the bandwidth of a subchannel allocated to the HE STA is 0 MHz, confirming that the first 3-bit information of $N_{BW}$ is b000. Allocation of a subchannel bandwidth of 0 MHz means that there is no HE PPDU transmission to the HE STA.

In another example, if Group ID 61 is mapped to STA Position 2 unlike [Table 2], the HE STA may determine that the bandwidth of a subchannel allocated to the HE STA is 5 MHz, confirming that the second 3-bit information of $N_{BW}$ is b001. If Group ID 61 is mapped to STA Position 3 unlike [Table 2], the HE STA may determine that the bandwidth of a subchannel allocated to the HE STA is 5 MHz, confirming that the third 3-bit information of $N_{BW}$ is b001.

Figure 8:
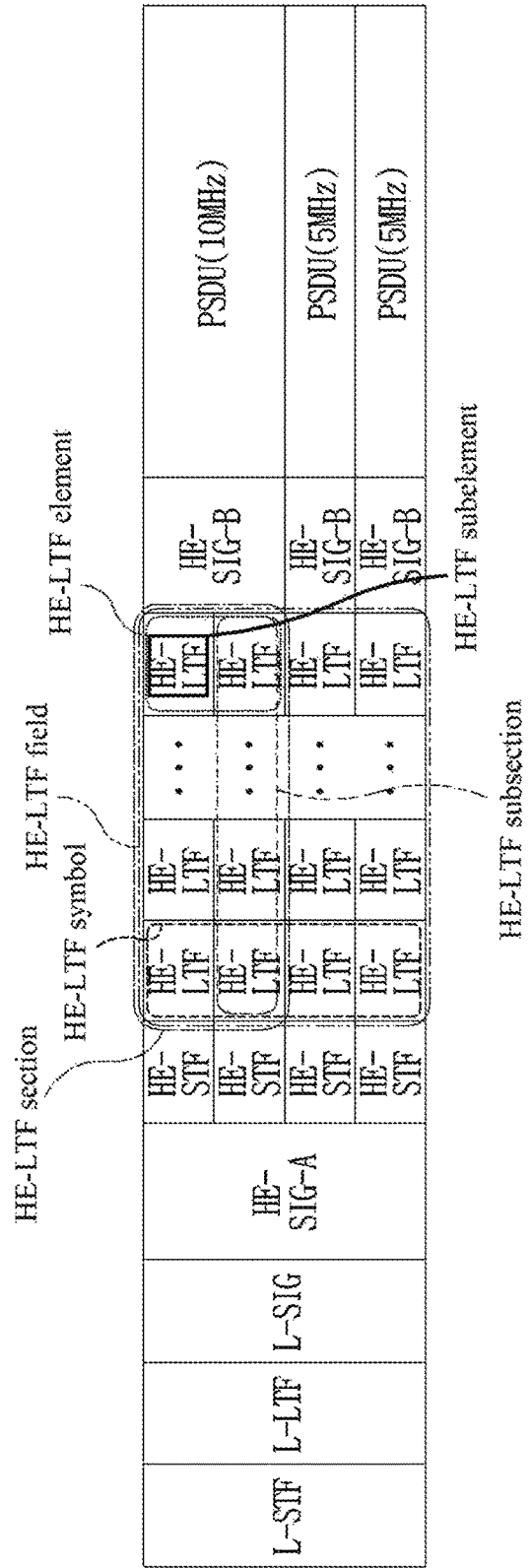
FIG. 8 depicts subchannel allocation in a HE PPDU frame format according to the present invention.

FIG. 8 depicts subchannel allocation in the HE PPDU frame format according to the present invention.

In FIG. 8, $N_{BW}$ is b000, b001, b001, and b010 in a HE PPDU for MU-MIMO-mode or OFDMA-mode transmission to STAs corresponding to STA Positions 1, 2, 3, and 4, by way of example. In this case, no subchannel (0 MHz) may be allocated to a STA corresponding to STA Position 1, a 5-MHz subchannel may be allocated to STAs corresponding to each of STA Positions 2 and 3, and a 10-MHz subchannel may be allocated to a STA corresponding to STA Position 4.

In the example of FIG. 8, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 8, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 8 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 8, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. It is to be understood that a HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 8, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 7, if one channel includes four subchannels, it may not be allowed to keep the third subchannel unallocated and empty, while the first, second, and fourth subchannels are allocated to STAs. However, the present invention does not exclude non-allocation of a intermediate subchannel of one channel to a STA.

Figure 9:
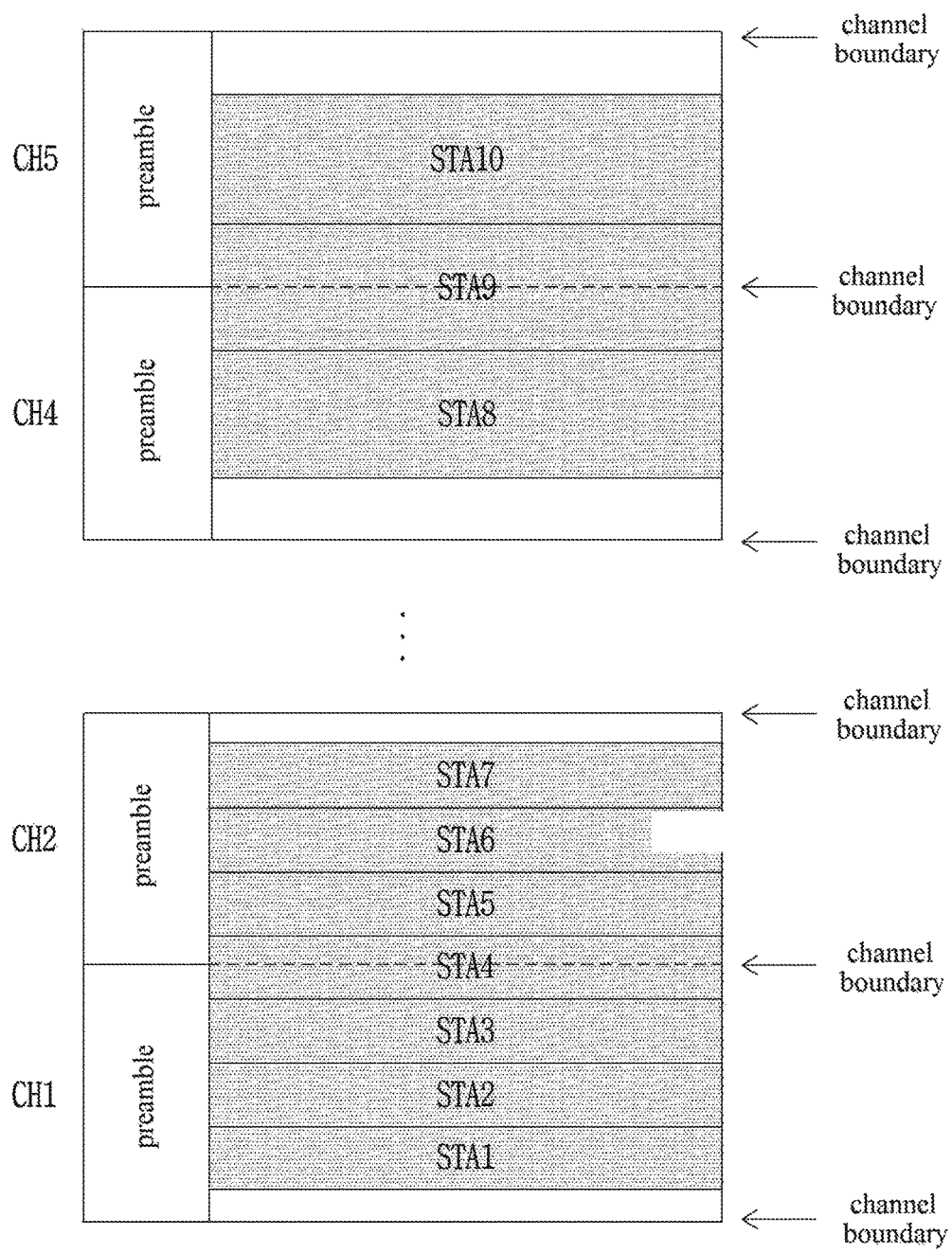
FIG. 9 depicts a subchannel allocation method according to the present invention.

FIG. 9 depicts a subchannel allocation method according to the present invention.

In the example of FIG. 9, a plurality of contiguous channels (e.g., 20-MHz-bandwidth channels) and boundaries of the plurality of contiguous channels are shown. In FIG. 9, a preamble may correspond to an L-STF, an L-LTF, an L-SIG, and a HE-SIG-A as illustrated in the examples of FIGS. 7 and 8.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 9 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present invention, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels). In the forgoing example of the present invention, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given of FIGS. 10 to 16 with an assumption that one subchannel has a channel bandwidth of 5 MHz in one channel having a channel bandwidth of 20 MHz, this is provided to simplify the description of the principle of the present invention and thus should not be construed as limiting the present invention. For example, the bandwidths of a channel and a subchannel may be defined or allocated as values other than the above examples. In addition, a plurality of subchannels in one channel may have the same or different channel widths.

FIG. 10 depicts the starting and ending points of a HE-LTF field in the HE PPDU frame format according to the present invention.

To support the MU-MIMO mode and the OFDMA mode, the HE PPDU frame format according to the present invention may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 10 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present invention, if one subchannel carries two partial streams in total, two HE-LTFs are to be transmitted. If one subchannel carries three partial streams in total, four HE-LTFs are to be transmitted. If one subchannel carries four partial streams in total, four HE-LTFs are to be transmitted. If one subchannel carries five partial streams in total, six HE-LTFs are to be transmitted. If one subchannel carries six partial streams in total, six HE-LTFs are to be transmitted. If one subchannel carries seven partial streams in total, eight HE-LTFs are to be transmitted. If eight subchannel carries three partial streams in total, eight HE-LTFs are to be transmitted. These are listed in [Table 3].

TABLE 3

| Total number of spatial streams transmitted on one subchannel | Number of HE-LTFs |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

Referring to [Table 3], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 10 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 10, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 7) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 3]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 7) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 10 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU- MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 10, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

Figure 11:
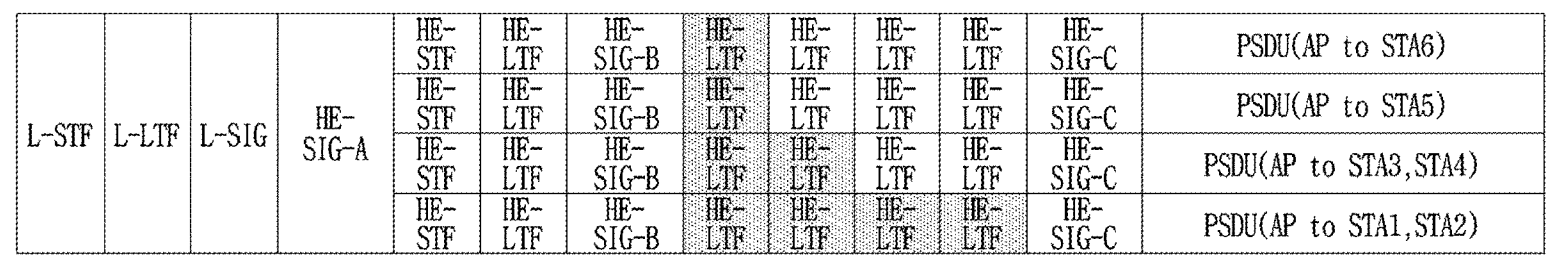

FIG. 11 depicts a HE-SIG-B field and a HE-SIG-C field in the HE PPDU frame format according to the present invention.

To effectively support MU-MIMO-mode or OFDMA-mode transmission in the HE PPDU frame format according to the present invention, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

If up to four spatial streams can be transmitted to one HE STA in the MU-MIMO or OFDMA mode and up to four HE STAs can receive an MU-MIMO-mode or OFDMA-mode transmission on one subchannel simultaneously, 12-bit signaling information is required to indicate the number of spatial streams allocated to each HE STA. If up to four subchannels can be configured in one 20-MHz channel, signaling information having a total size of 48 bits is required. In this manner, information about the number of spatial streams on one channel may be included in, for example, a HE-SIG-A field.

To reduce the signaling overhead, spatial stream allocation information may be transmitted independently for each subchannel. That is, spatial stream information for a subchannel may be defined separately from spatial stream information for another subchannel (i.e., the spatial stream information may be the same or different for each subchannel) and encoded independently. In the example of FIG. 11, a HE-SIG-B field may include spatial stream allocation information about one subchannel. For example, the HE-SIG-B field of the first subchannel may include spatial stream allocation information about STA1 and STA2, the HE-SIG-B field of the second subchannel may include spatial stream allocation information about STA3 and STA4, the HE-SIG-B field of the third subchannel may include spatial stream allocation information about STA5, and the HE-SIG-B field of the fourth subchannel may include spatial stream allocation information about STA6. Spatial stream allocation information may be represented as a combination of a Group ID and $N_{STS}$. The number of spatial streams to be transmitted to STAs of a group corresponding to the Group ID may be indicated by $N_{STS}$.

Also, a HE-SIG-C field may be transmitted after transmission of HE-LTFs, including MCS information about a PSDU and information about the length of the PSDU, etc.

Figure 12:
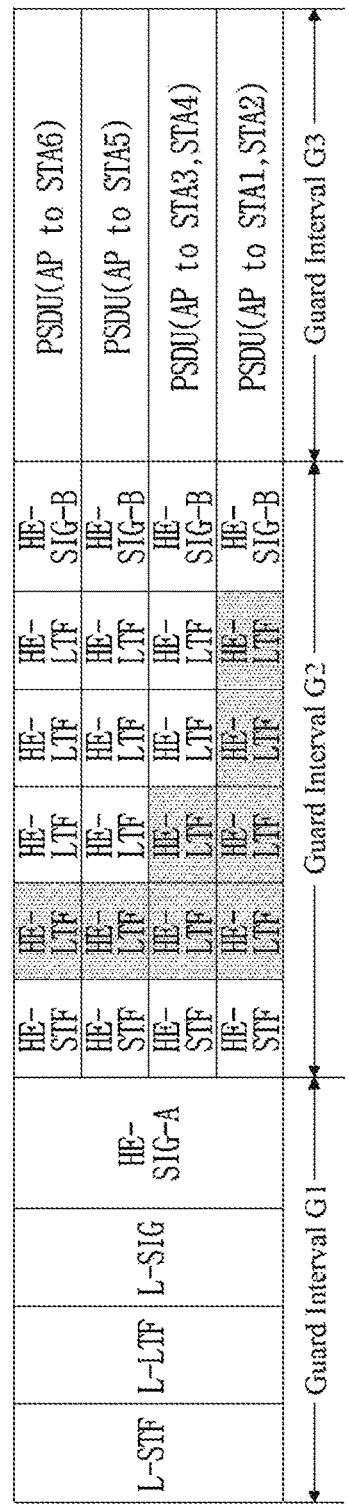
FIG. 12 depicts an example of Orthogonal Frequency Division Multiplexing (OFDM) symbol durations and Guard Intervals (GIs) in a HE PPDU frame format according to the present invention.

FIG. 12 depicts OFDM symbol durations and GI lengths in the HE PPDU frame format according to the present invention.

In the HE PPDU frame format according to the present invention, L-STF, L-LTF, L-SIG, and HE-SIG-A fields may be configured with 4.0-μs OFDM symbols based on 64-FFT. One OFDM symbol has a GI of 0.8 μs. In the present invention, a GI value applied to the L-STF, L-LTF, L-SIG, and HE-SIG-A fields is defined as G1. The L-STF, L-LTF, L-SIG, and HE-SIG-A fields may include 3.2-μs OFDM symbols based on 64-FFT, excluding the GIs. The term 64 FFT-based symbol is used mainly based on a channel bandwidth of 20 MHz. If the term 64 FFT-based symbol is used irrespective of a channel bandwidth, a 64 FFT-based symbol may mean a symbol having a symbol duration of 3.2 μs and a subcarrier spacing of 312.5 kHz.

The following HE-STF, HE-LTF, HE-SIG-B, and PSDU fields may include 16-μs OFDM symbols based on 256-FFT. The OFDM symbol duration may be changed according to a GI value. Two types of GI values may be defined for one OFDM symbol during different time periods. A GI value applied to the OFDM symbols of the HE-STF, HE-LTF, and HE-SIG-B fields is defined as G2 and a GI value applied to the OFDM symbols of the PSDU is defined as G3. Excluding the GIs, the HE-STF, HE-LTF, HE-SIG-B, and PSDU fields may be configured with 12.8-μs OFDM symbols based on 256-FFT. The term 256 FFT-based symbol is used mainly based on a channel bandwidth of 20 MHz. If the term 256 FFT-based symbol is used irrespective of a channel bandwidth, a 256 FFT-based symbol may mean a symbol having a symbol duration of 12.8 μs and a subcarrier spacing of 78.125 kHz.

The values of G2 and G3 may be equal or different. If G2 and G3 are equal, G2 and G3 may be defined as one parameter without distinguishing between G2 and G3. Unlike G1, G2 and G3 may vary according to a transmitted PPDU transmission vector, rather than they are fixed values (i.e., predetermined values). This is related to that the lengths of the HE-STF, HE-LTF, and HE-SIG-B fields to which G2 is applied may vary according to a PPDU transmission vector and the length of the PSDU to which G3 is applied may also vary according to the PPDU transmission vector.

For example, G1 may have a fixed value (i.e., a predetermined value) of 0.8 μs, G2 may be a value selected from 3.2 μs, 1.6 μs, 0.8 μs, and 0.4 μs, and G3 may be a value selected from among 3.2 μs, 1.6 μs, 0.8 μs, and 0.4 μs. Also, G1 may have a fixed value (i.e., a predetermined value) of 0.8 μs, and G2 or G3 may be a value selected or determined from among 3.2 μs, 1.6 μs, 0.8 μs, and 0.4 μs, G1 does not require separate signaling because G1 is a fixed value, and signaling information indicating G2 and G3 may be provided in the HE-SIG-A field to a HE STA.

G2 and G3 are applied commonly across all OFDM symbols transmitted during a corresponding time period and across all subchannels. Accordingly, PSDU transmission timings and OFDM symbol timings may be synchronized. For example, it is not allowed to apply a 3.2-μs G2 value to a subchannel and a 1.6-μs or 0.8-μs G2 value to another subchannel during a specific time period. Rather, the same 3.2-μs G2 value should be applied to the subchannels during the same time period. In a similar example, it is not allowed to apply a 1.6-μs G3 value to a subchannel and a 3.2-μs or 0.8-μs G3 value to another subchannel during a specific time period. Rather, the same 1.6-μs G3 value should be applied to the subchannels during the same time period.

In the case where a HE PPDU frame format having HE-LTF sections of different lengths for subchannels is used (i.e., in the case where the number of HE-LTFs is not determined for each subchannel based on the maximum of the numbers of HE-LTFs required according to the total number of spatial streams transmitted on each subchannel in a set of HE STAs allocated to each of subchannels, as described in the example of FIG. 10), if the values of G2 and G3 are different, PSDUs are transmitted on different subchannels at different time points and OFDM symbol timings are not synchronized. Therefore, values of G2 and G3 may need to be selected or determined as a same value.

In the case where a HE PPDU frame format having HE-LTF sections of the same length for subchannels is used (i.e., in the case where the number of HE-LTFs is determined for each subchannel based on the maximum of the numbers of HE-LTFs required according to the total number of spatial streams transmitted on each subchannel in a set of HE STAs allocated to each of subchannels, as described in the example of FIG. 10), even though the values of G2 and G3 are different, PSDUs are transmitted on the subchannels at the same time point, without causing discrepancy between OFDM symbol timings. Therefore, values of G2 and G3 may be selected or determined as different values. However, even in this case, the present invention does not exclude that values of G2 and G3 may be selected or determined as a same value.

In the example of FIG. 12, OFDM symbol durations S1, S2, and S3 may be applied respectively to time periods to which the GIs G1, G2, and G3 are applied.

Figure 13:
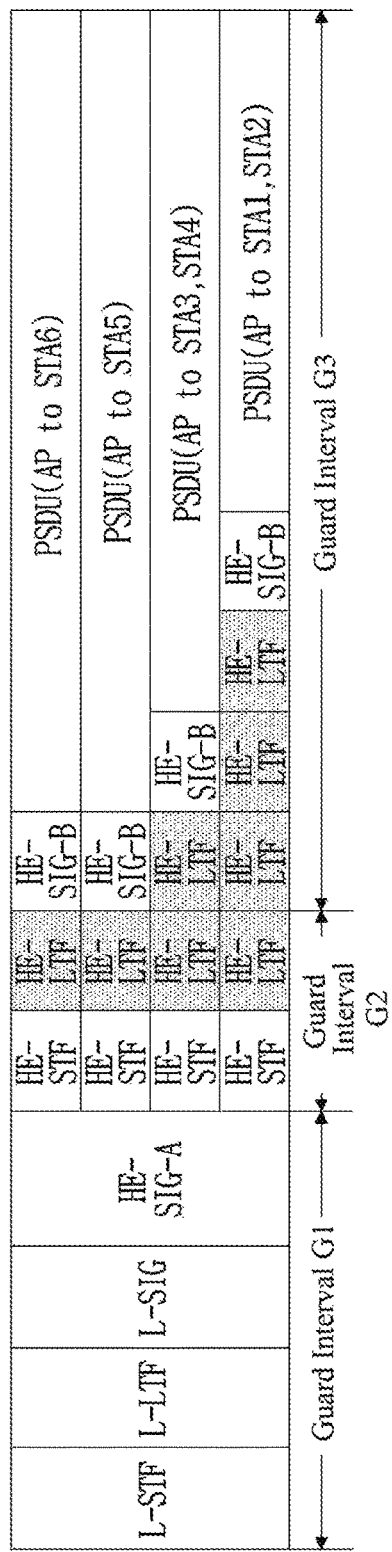
FIG. 13 depicts another example OFDM symbol durations and GIs in a HE PPDU frame format according to the present invention.

FIG. 13 depicts another example of OFDM symbol durations and GI lengths in the HE PPDU frame format according to the present invention.

In the example of FIG. 13, the HE PPDU frame format may maintain the OFDM symbol timing of each subchannel aligned even though subchannels differ in PSDU transmission time points (i.e., the subchannels differ in the lengths of HE-LTF sections).

It has been described before with reference to the example of FIG. 12 that the length of a time period to which the G2 is applied of the HE PPDU frame format is variable (i.e., the length of the HE-STF, HE-LTF, and HE-SIG-B fields to which G2 is applied is variable according to a PPDU transmission vector). In addition to the example of FIG. 12, it is proposed in the example of FIG. 13 that a time period to which G2 is applied in the HE PPDU frame format varies.

Specifically, G2 of the HE PPDU frame format may be defined as a GI value applied to a HE-STF, one or more HE-LTF symbols, or one or more OFDM symbols of a HE-SIG-B field. For example, G2 may be applied only to the HE-STF, or G2 may be applied only to the one or more HE-LTF symbols, or G2 may be applied only to the HE-SIG-B. If there are a plurality of HE-LTF elements on a subchannel, G2 may be applied to all or a part of the plurality of HE-LTF elements. Further, G2 may be applied to a HE-STF and one or more HE-LTF symbols, or G2 may be applied to one or more HE-LTF symbols and a HE-SIG-B, or G2 may be applied to a HE-STF and a HE-SIG-B, or G2 may be applied to an HE-STF, one or more HE-LTF symbols, and a HE-SIG-B. In the example of FIG. 12, G2 may be applied to a HE-SIG-C field or a part or whole of a PSDU, in addition to a HE-STF, one or more HE-LTF symbols, and a HE-SIG-B field. A time period to which G2 is applied may be set to 0 (i.e., there may be no time period to which G2 is applied). While G2 is applied only to a HE-STF and one HE-LTF symbol in the example of FIG. 13, this should not be construed as limiting the scope of the present invention.

In the example of FIG. 13, G2 may be applied to the HE-STF and the HE-LTF and then G3 may be applied to zero or more HE-LTF elements, the HE-SIG-B, and the PSDU. For example, G3 is applied to three HE-LTF elements, a HE-SIG-B field, and a PSDU field on the first subchannel, to one HE-LTF element, a HE-SIG-B field, and a PSDU field on the second subchannel, to a HE-SIG-B field and a PSDU field on the third subchannel, and to a HE-SIG-B field and a PSDU field on the fourth subchannel.

These G2 and G3 values are applied commonly across all OFDM symbols transmitted during a corresponding time period, and across all subchannels. That is, the same GI values should be applied to all subchannels during a specific time period.

In another example, if a GI for the first OFDM symbol following the HE-SIG-A field, that is, G2 is a fixed value (i.e., a predefined value), the decoding complexity of a receiving STA may be reduced. For example, G2 may be set to 0.8 μs equal to G1 or a fixed value different from G1. As a consequence, the signaling overhead of G2 may be reduced. G3 may not be a fixed value but a variable value depending on a PPDU transmission vector. For example, G1 may be fixed to 0.8 μs, G2 may be fixed to one of 3.2 μs, 1.6 μs, 0.8 μs, and 0.4 μs, G3 may be selected or determined from among 3.2 μs, 1.6 μs, 0.8 μs, and 0.4 μs, and signaling information indicating G3 may be included in the HE-SIG-A field.

In the example of FIG. 13, OFDM symbol durations S1, S2, and S3 may be applied respectively to time periods to which the GIs G1, G2, and G3 are applied.

Figure 14:
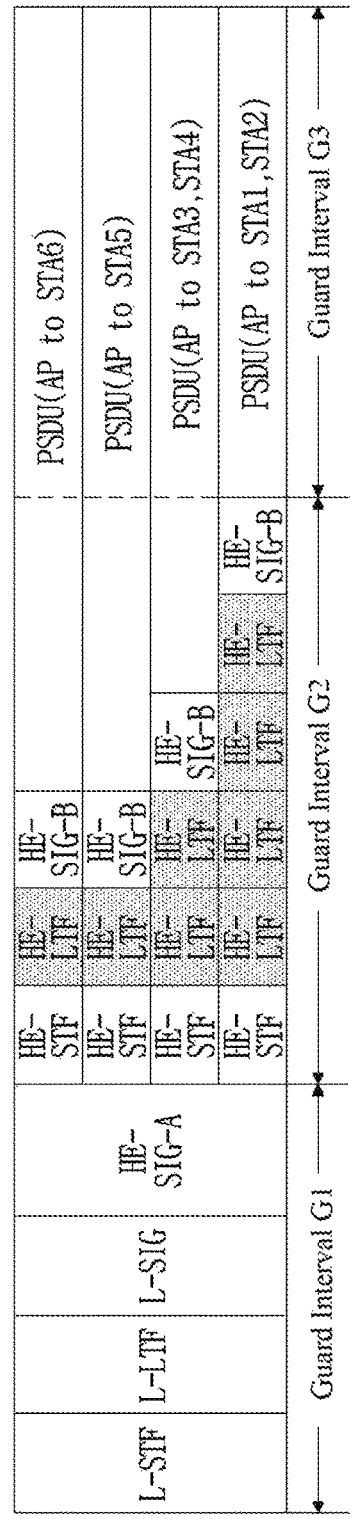
FIG. 14 depicts another example OFDM symbol durations and GIs in a HE PPDU frame format according to the present invention.

FIG. 14 depicts another example of OFDM symbol durations and GI lengths in the HE PPDU frame format according to the present invention.

As described before with reference to the example of FIG. 13, a time period to which G2 is applied may span beyond the HE-STF and the HE-LTF. In the example of FIG. 14, a time period to which G2 is applied spans from the HE-STF field to the HE-SIG-B field on the first subchannel.

In this case, G2 may be applied to parts of PSDUs transmitted to STA3, STA4, STA5, and STA6 allocated to the second, third, and fourth subchannels, while G3 may be applied to the remaining parts of the PSDUs. This means that one PSDU transmission may involve two or more transmission periods and a different GI may be applied to each of the transmission periods. Similarly, one PSDU transmission may involve two or more transmission periods and a different OFDM symbol duration may be applied to each of the transmission periods. In the example of FIG. 14, a time period to which G2 is applied may be set to a specific value, which is fixed (or predefined) or signaled by the HE-SIG-A field.

In the example of FIG. 14, OFDM symbol durations S1, S2, and S3 may be applied respectively to time periods to which the GIs G1, G2, and G3 are applied.

While, for simplicity, a HE PPDU frame format defined for one 20-MHz channel has been taken as an example in the foregoing description, the present invention is not limited to the HE PPDU frame format defined for one 20-MHz channel. Exemplary HE PPDU frame formats for channel bandwidths defined by a plurality of 20-MHz channels (i.e., 40 MHz, 80 MHz, or 160 MHz) will be described below.

Figure 15:
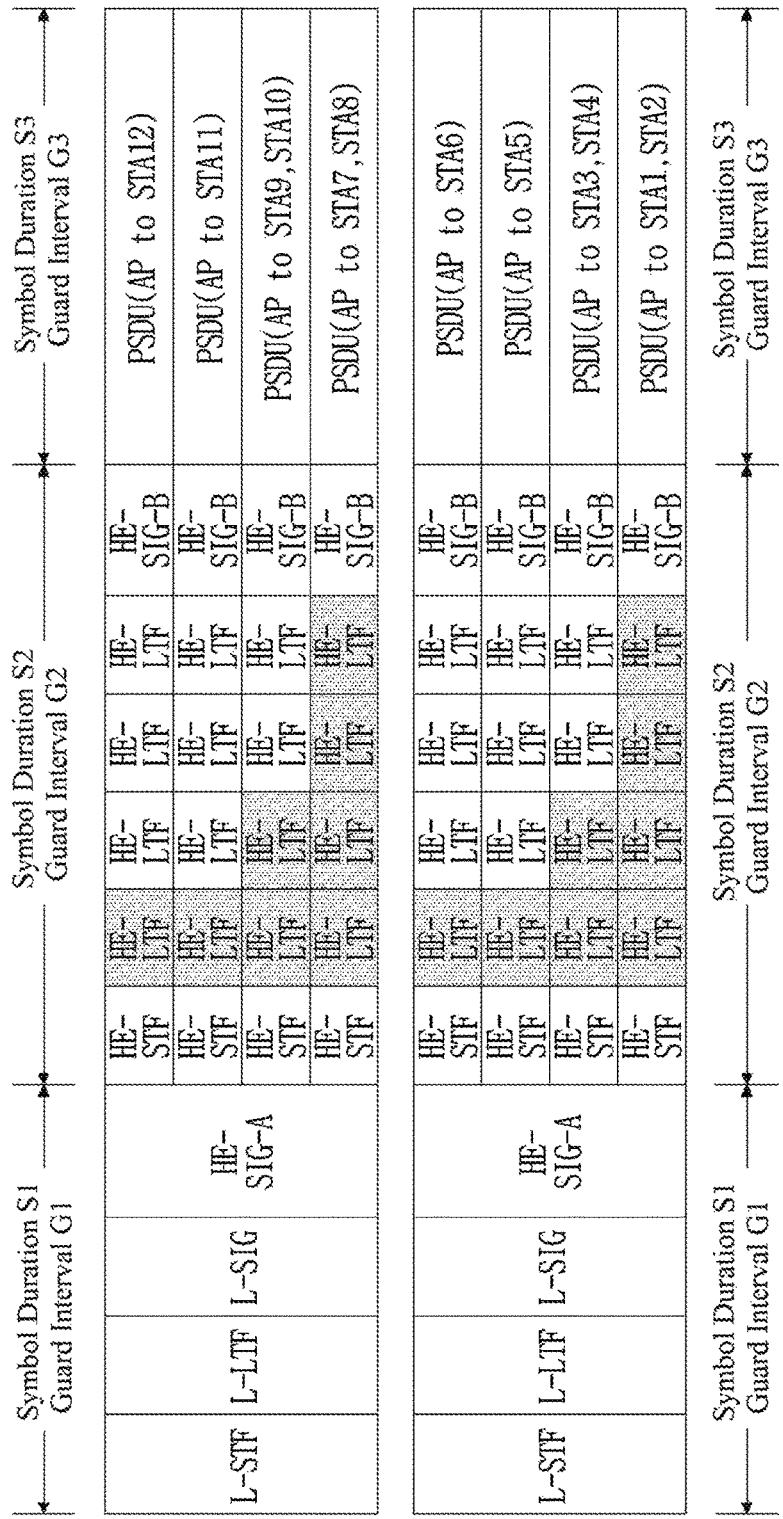
FIG. 15 depicts an exemplary HE PPDU frame format for a wide channel band according to the present invention.

FIG. 15 depicts an exemplary HE PPDU frame format for a wide channel band according to the present invention.

Referring to FIG. 15, the HE PPDU frame format for one 20-MHz channel illustrated in the example of FIG. 12 is extended to two 20-MHz channels. Similarly, HE PPDU frame formats for the channel bandwidths of 80 MHz and 160 MHz may be configured by extending the HE PPDU frame format for one 20-MHz channel illustrated in the example of FIG. 12 to four and eight 20-MHz channels, respectively.

There is no modification involved in extending the HE PPDU frame format for one 20-MHz channel. In other words, all subchannels across one or more 20-MHz channels are the same in terms of PSDU transmission time points, OFDM symbol durations, and GIs.

From this viewpoint, the example described with reference to FIG. 10 in which "the lengths of HE-LTF sections across subchannels are equal" may be extended to simultaneous application on a channel basis as well as on a subchannel basis. Therefore, PSDU transmission timings and OFDM symbol timings are synchronized for users paired for MU-MIMO-mode or OFDMA-mode transmission, thus maintaining orthogonality. This channel-based example will be described below.

Basically in SU-MIMO-mode or non-OFDMA-mode transmission, it is sufficient to transmit as many HE-LTFs as required. However, the timings of fields transmitted on subchannels for other paired STAs need to be synchronized (or aligned) across all subchannels over one or more 20-MHz channels in MU-MIMO-mode or OFDMA-mode transmission. Therefore, the numbers of HE-LTFs on all other subchannels over one or more 20-MHz channels may be determined based on a subchannel having a maximum number of streams among all subchannels over one or more 20-MHz channels in MU-MIMO-mode or OFDMA-mode transmission.

Specifically, the numbers of HE-LTFs to be transmitted on all subchannels may be determined according to the maximum of the numbers of HE-LTFs required according to the total numbers of spatial streams transmitted on each subchannels over one or more 20-MHz channels, for a set of HE STAs allocated to each of the subchannels. Herein, 'the set of HE STAs allocated to each of the subchannels over one or more 20-MHz channels' is one HE STA in the SU-MIMO mode, whereas it is a set of a plurality of HE STAs paired on all subchannels over one or more 20-MHz channels in the MU-MIMO mode or OFDMA mode. The 'total number of spatial streams transmitted on each of all subchannels over one or more 20-MHz channels' is the number of spatial streams transmitted to one HE STA in the SU-MIMO mode and the number of spatial streams transmitted to a plurality of HE STAs paired on the subchannel in the MU-MIMO mode or OFDMA mode.

That is, it may be said that a HE-LTF field starts at the same time point and ends at the same time point on all subchannels over one or more 20-MHz channels for all users (i.e., HE STAs) in MU-MIMO-mode or OFDMA-mode transmission of a HE PPDU. Or it may be said that the lengths of HE-LTF sections are equal on all subchannels over one or more 20-MHz channels for all HE STAs in MU-MIMO-mode or OFDMA-mode transmission. Or it may be said that the number of HE-LTF elements included in each HE-LTF section is equal in all subchannels over one or more 20-MHz channels for all HE STAs in MU-MIMO-mode or OFDMA-mode transmission. Accordingly, PSDU transmission timings may be synchronized between all subchannels over one or more 20-MHz channels for all HE STAs in MU-MIMO-mode or OFDMA-mode transmission.

In FIG. 15, the OFDM symbol duration and GI of L-STF, L-LTF, L-SIG, and HE-SIG-A fields on the first 20-MHz subchannel are S1 and G1, respectively. Like the first 20-MHz subchannel, the first 20-MHz subchannel has S1 and G1 respectively as the OFDM symbol duration and GI of L-STF, L-LTF, L-SIG, and HE-SIG-A fields.

In FIG. 15, a HE-STF field, a plurality of HE-LTFs, and a HE-SIG-B field on the first 20-MHz channel are S2 and G2, respectively. Like the first 20-MHz channel, the OFDM symbol duration and GI of a HE-STF field, a plurality of HE-LTFs, and a HE-SIG-B field on the second 20-MHz channel are also S2 and G2, respectively.

In FIG. 15, the OFDM symbol duration and GI of a PSDU on the first 20-MHz channel are S3 and G3, respectively. Like the first 20-MHz channel, the OFDM symbol duration and GI of a PSDU on the second 20-MHz channel are also S3 and G3, respectively.

This example means that if the OFDM symbol duration and GI of one 20-MHz channel are determined based on 64-FFT, the OFDM symbol duration and GI of the other 20-MHz channel(s) should be determined based on 64-FFT. In other words, if the OFDM symbol duration and GI of one 20-MHz channel are determined based on 64-FFT, the OFDM symbol duration and GI of the other 20-MHz channel(s) should not be determined based on 256-FFT.

In a modification example, although subchannels within one 20-MHz channel may have the same OFDM symbol durations and the same GIs, subchannels within another 20-MHz channel may have different OFDM symbol durations and GIs. For example, while S2, G2, S3, and G3 are applied as OFDM symbol durations and GIs for subchannels within the first 20-MHz channel, different values (e.g., S4, G4, S5, and G5) may be applied as OFDM symbol durations and GIs for subchannels within the second 20-MHz channel. Even in this case, the OFDM symbol duration and GI, S1 and G1, applied to L-STF, L-LTF, and L-SIG fields in a different 20-MHz channel are the same fixed values in every 20-MHz channel.

Further, this modification example may include application of the example described before with reference to FIG. 10 in which 'subchannels have the same HE-LTF section length' only to subchannels within one 20-MHz channel, not to the HE-LTF section length of subchannels in another 20-MHz channel.

Figure 16:
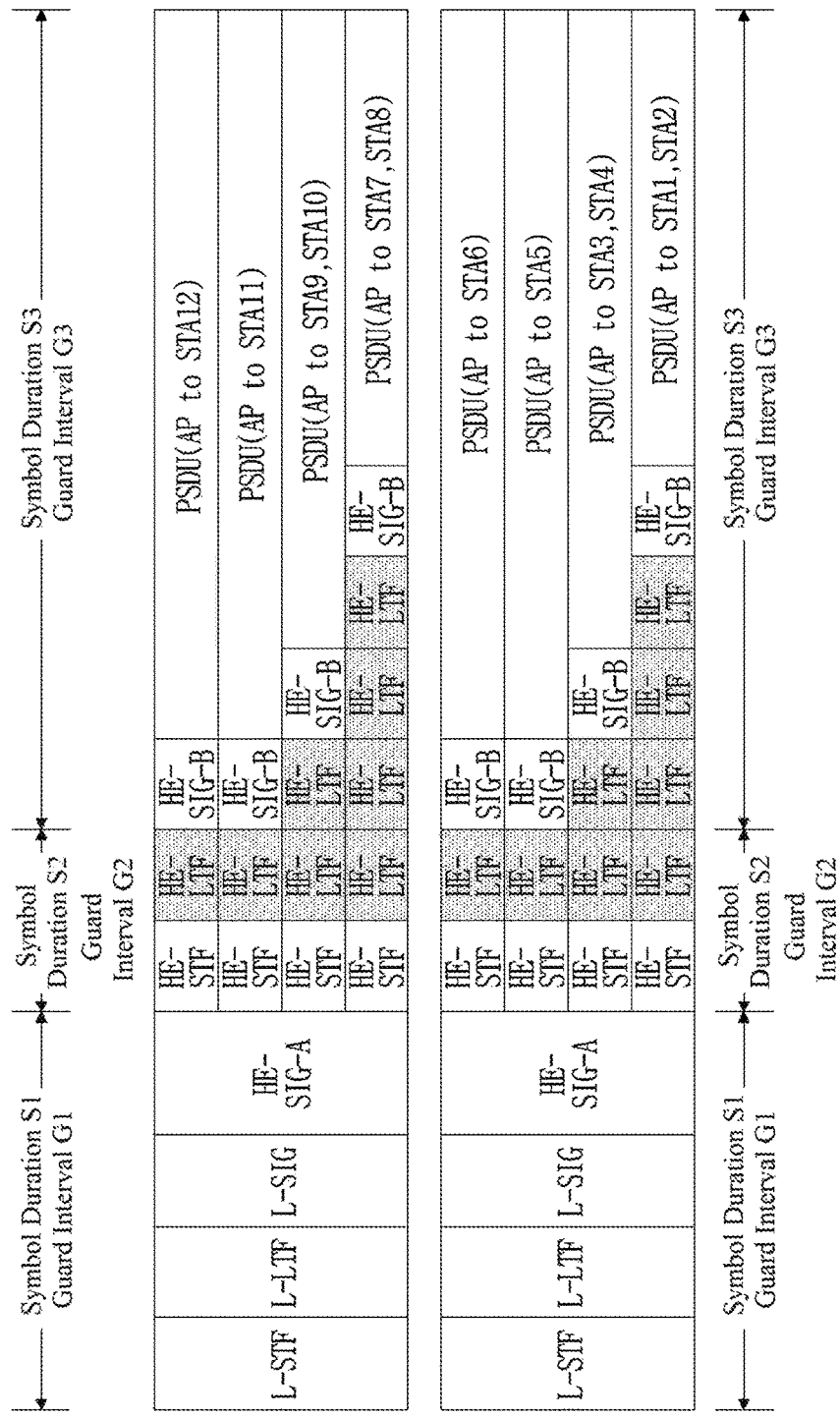
FIG. 16 depicts another exemplary HE PPDU frame format for a wide channel band according to the present invention.

FIG. 16 depicts an exemplary HE PPDU frame format for a wide channel band according to the present invention.

Referring to FIG. 16, the HE PPDU frame format for one 20-MHz channel illustrated in the example of FIG. 13 is extended to two 20-MHz channels. Similarly, HE PPDU frame formats for the channel bandwidths of 80 MHz and 160 MHz may be configured by extending the HE PPDU frame format for one 20-MHz channel illustrated in the example of FIG. 13 to four and eight 20-MHz channels.

There is no modification involved in extending the HE PPDU frame format for one 20-MHz channel. In other words, since the subchannels differ in PSDU transmission time points (i.e., in HE-LTF section lengths) as illustrated in FIG. 13, the HE PPDU frame format that maintains an OFDM symbol timing of each subchannel constant is extended. Therefore, all subchannels over one or more 20-MHz channels are the same in terms of OFDM symbol durations and GIs despite different PSDU transmission time points.

In FIG. 16, the OFDM symbol duration and GI of L-STF, L-LTF, L-SIG, and HE-SIG-A fields on the first 20-MHz subchannel are S1 and G1, respectively. Like the first 20-MHz subchannel, the first 20-MHz subchannel has S1 and G1 respectively as the OFDM symbol duration and GI of L-STF, L-LTF, L-SIG, and HE-SIG-A fields.

In FIG. 16, the OFDM symbol duration and GI of a HE-STF and HE-LTF symbols are S2 and G2, respectively. Like the first 20-MHz channel, the OFDM symbol duration and GI of HE-STF and HE-LTF symbols on the second 20-MHz channel are also S2 and G2, respectively.

In FIG. 16, after the HE-STF and the HE-LTF to which the symbol duration S2 and the G2 are applied on the first 20-MHz channel, the G3 may be applied to zero or more HE-LTF symbols, a HE-SIG-B field, and a PSDU according to subchannels on the first 20-MHz channel. For example, G3 is applied to three HE-LTF elements, a HE-SIG-B field, and the PSDU on the first subchannel of the first 20-MHz channel, to one HE-LTF element, a HE-SIG-B field, and a PSDU on the second subchannel of the first 20-MHz channel, to a HE-SIG-B field and a PSDU on the third subchannel of the first 20-MHz channel, and to a HE-SIG-B field and a PSDU field on the fourth subchannel of the first 20-MHz channel. Also, after the HE-STF and the HE-LTF to which the symbol duration S2 and the G2 are applied on the second 20-MHz channel, the G3 may be applied to zero or more HE-LTF elements, a HE-SIG-B, and a PSDU according to subchannels on the second 20-MHz channel, like the first 20-MHz channel. For example, on the second 20-MHz channel, G3 is applied to three HE-LTF elements, a HE-SIG-B field, and a PSDU on the first subchannel, to one HE-LTF element, HE-SIG-B field, and a PSDU on the second subchannel, to a HE-SIG-B field and a PSDU field on the third subchannel, and to a HE-SIG-B field and a PSDU field on the fourth subchannel.

S2, G2, S3, and G3 are applied commonly across all OFDM symbols transmitted during a corresponding time period and across all subchannels. The same symbol durations and GIs should be applied to all subchannels of one or more 20-MHz channels.

This example means that if the OFDM symbol duration and GI of one 20-MHz channel are determined based on 64-FFT, the OFDM symbol duration and GI of the other 20-MHz channel(s) should be determined based on 64-FFT. In other words, if the OFDM symbol duration and GI of one 20-MHz channel are determined based on 64-FFT, the OFDM symbol duration and GI of the other 20-MHz channel(s) should not be determined based on 256-FFT.

In a modification example, although subchannels within one 20-MHz channel may have the same OFDM symbol durations and the same GIs, subchannels within another 20-MHz channel may have different OFDM symbol durations and GIs. For example, while S2, G2, S3, and G3 are applied as OFDM symbol durations and GIs for subchannels within the first 20-MHz channel, different values (e.g., S4, G4, S5, and G5) may be applied as OFDM symbol durations and GIs for subchannels within the second 20-MHz channel in the example of FIG. 15. Even in this case, the OFDM symbol duration and GI applied to the L-STF, L-LTF, and L-SIG fields in a different 20-MHz channel are the same fixed values in every 20-MHz channel.

FIG. 17 is a flowchart illustrating an exemplary method according to the present invention.

Referring to FIG. 17, in step S1710, an AP may generate an HE-LTF field for a plurality of STAs according to the proposal of the present invention about the starting and ending points of the HE-LTF field (or the number of HE-LTF elements transmitted on one subchannel) in consideration of MU-MIMO-mode or OFDMA-mode transmission. Although generation of fields other than the HE-LTF field are not described in the example of FIG. 17, one or more of the fields of the HE PPDU frame format according to the present invention (e.g., L-STF, L-LTF, L-SIG, HE-SIG-A, HE-STF, HE-LTF(s), HT-SIG-B, HT-SIG-C, and PSDU) may be generated for a frame including data to be transmitted to the plurality of STAs in S1710.

It is defined that, at AP, numbers of HE-LTF elements (numbers of HE-LTF elements included in a HE-LTF section) for each of the plurality of subchannels are same across the plurality of subchannels, irrespective of whether the same number or different numbers of spatial streams are transmitted on the subchannels (or even though different numbers of spatial streams are transmitted on the subchannels). For example, if the first subchannel includes four HE-LTFs, which is more than a number of HE-LTFs of any other subchannel (each of subchannels related to the MU-MIMO-mode or OFDMA-mode transmission), each of the other subchannels includes four HE-LTFs. This may mean that the HE-LTF section of a subchannel starts and ends at the same time points as the HE-LTF sections of other subchannels.

Also, the same OFDM symbol duration and the same GI may be maintained for a plurality of subchannels. At least, OFDM symbol duration applied to the HE-LTF section of each of a plurality of subchannels may be same across the plurality of subchannels. Also, GI applied to the HE-LTF section of each of a plurality of subchannels may be same across the plurality of subchannels.

The description of an operation for configuring a PPDU frame by an AP given with reference to FIG. 17 is also applied to a case in which a plurality of subchannels are defined across a plurality of channels as well as a single channel. In this case, it is not allowed to allocate one subchannel crossing the boundary between a plurality of channels.

In step S1720, the AP may transmit a PPDU frame including the fields generated in step S1710 (particularly, the HE-LTF field and data for a plurality of STAs) to one or more STAs.

In steps S1730 and S1740, a STA may receive the PPDU frame (particularly, a PPDU frame including the HE-LTF field and data for the plurality of STAs) from the AP. In addition, the PPDU frame received at the STA may further include one or more of the fields (e.g., L-STF, L-LTF, L-SIG, HE-SIG-A, HE-STF, HE-LTF(s), HT-SIG-B, HT-SIG-C, and PSDU) of the HE PPDU frame format proposed by the present invention.

Further, the STA may perform channel estimation on a subchannel carrying data for the STA. The channel estimation may be based on one or more HE-LTF elements of a HE-LTF section of the subchannel. The STA may decode data (e.g., a PSDU) received in the PPDU frame based on the estimated channel.

While the exemplary method has been described with reference to FIG. 17 as a series of operations for simplicity of description, this does not limit the sequence of steps. When needed, steps may be performed at the same time or in a different sequence. All of the exemplary steps are not always necessary to implement the method proposed by the present invention.

The foregoing embodiments of the present invention may be implemented independently or one or more of the embodiments may be implemented simultaneously, for the method of FIG. 17.

The present invention includes an apparatus for processing or performing the method of the present invention (e.g., the wireless device and its components described with reference to FIGS. 1, 2, and 3).

The present invention includes software (an operating system (OS), an application, firmware, a program, etc.) for executing the method of the present invention in a device or a computer, and a medium storing the software that can be executed in a device or a computer.

While various embodiments of the present invention have been described in the context of an IEEE 802.11 system, they are applicable to various mobile communication systems.

What is claimed is:

1. A method for transmitting data to a plurality of Stations (STAs) by an Access Point (AP) in a Wireless Local Area Network (WLAN), the method comprising:
   allocating one or more of the STAs of the plurality of STAs to each of a plurality of sub channels;
   generating a High Efficiency-Long Training Field (HE-LTF) for the plurality of STAs by:
      determining, for each subchannel of the plurality of subchannels respectively, a sum of a number of spatial streams allocated to all STAs of the subchannel,
      determining a maximum of the respective sums of the subchannels of the plurality of subchannels, and
      including a plurality of HE-LTF symbols in the HE-LTF, a number of the plurality of HE-LTF symbols being equal to or greater than the maximum of the respective sums; and
   transmitting a Physical layer Protocol Data Unit (PPDU) frame to the plurality of STAs, the PPDU frame including the HE-LTF and data for the plurality of STAs,
   wherein the data for the plurality of STAs are transmitted to different STA on each of a plurality of subchannels, and
   wherein a starting point of the HE-LTF is same across the plurality of STAs and an end point of the HE-LTF is same across the plurality of STAs.

2. The method of claim 1, wherein including the plurality of HE-LTF symbols in the HE-LTF comprises:
   including two HE-LTF symbols when the maximum of the respective sums is equal to two;
   including four HE-LTF symbols when the maximum of the respective sums is equal to three or equal to four;
   including six HE-LTF symbols when the maximum of the respective sums is equal to five or equal to six; and
   including eight HE-LTF symbols when the maximum of the respective sums is equal to seven or equal to eight.

3. The method of claim 1, wherein the HE-LTF includes a plurality of HE-LTF sections in a frequency domain, and the number of HE-LTF elements included in each of the HE-LTF sections is equal across the plurality of STAs.

4. The method of claim 3, wherein the number of HE-LTF elements is equal across the plurality of subchannels.

5. The method of claim 3, wherein a starting point of the HE-LTF section for each of the plurality of subchannels is equal across the plurality of subchannels and an end point of the HE-LTF section for each of the plurality of subchannels is equal across the plurality of subchannels.

6. The method of claim 3, wherein in each of the plurality of subchannels, the respective plurality of HE-LTF elements are contiguous in a time domain.

7. The method of claim 3, wherein when the PPDU frame is transmitted in a Multi User-Multiple Input Multiple Output (MIMO) mode or an Orthogonal Frequency Division Multiple Access (OFDMA) mode, a starting point of the HE-LTF section for each of the plurality of subchannels is equal across the plurality of subchannels and an end point of the HE-LTF section for each of the plurality of subchannels is equal across the plurality of subchannels.

8. The method of claim 3, wherein Orthogonal Frequency Division Multiplexing (OFDM) symbol duration applied to the HE-LTF sections of each of the plurality of subchannels is equal across the plurality of subchannels, and a Guard Interval (GI) applied to the HE-LTF sections of each of the plurality of subchannels is equal across the plurality of subchannels.

9. The method of claim 1, wherein the plurality of subchannels are defined on a plurality of channels, each channel of the plurality of channels having a 20 MHz bandwidth.

10. The method of claim 9, wherein each of the plurality of subchannels subchannel is allocated without crossing a boundary between channels of the plurality of channels.

11. A method for receiving data from an Access Point (AP) by a Station (STA) of a plurality of STAs in a Wireless Local Area Network (WLAN), the method comprising:
    receiving a first High Efficiency-Long Training Field (HE-LTF) section in a first subchannel of a plurality of subchannels of a Physical layer Protocol Data Unit (PPDU) frame;
    performing channel estimation for the first subchannel using the first HE-LTF section; and
    receiving, from the first subchannel using the results of the channel estimation, data for the STA from among data for the plurality of STAs in the PPDU frame,
    wherein the data for the plurality of STAs are respectively transmitted to different STA on each of the plurality of subchannels,
    wherein each of the plurality of subchannels includes a respective HE-LTF section;
    wherein a starting point of the HE-LTF sections of the plurality of subchannels is same across the plurality of subchannels and an end point of the HE-LTF sections is same across the plurality of subchannels,
    wherein each of the HE-LTF sections includes a plurality of respective HE-LTF elements, and
    wherein the number of the plurality of HE-LTF elements is equal to or greater than the number of spatial streams transmitted in a subchannel having a maximum value among total numbers respectively corresponding to the plurality of subchannels, and each total number is a sum of the numbers of spatial streams allocated to all STAs in the corresponding subchannel.

12. The method of claim 11, further comprising:
    wherein at least two STAs are allocated to at least one of the plurality of subchannels for Multi-User Multiple Input Multiple Output (MU-MIMO) transmission.

13. The method of claim 12, wherein when a different number of spatial streams are transmitted on each of the subchannels, or irrespective of the number of spatial streams transmitted on each of the subchannels, the number of HE-LTF elements is equal across the plurality of subchannels.

14. The method according to claim 12, wherein for each of the plurality of subchannels the plurality of HE-LTF elements are contiguous in a time domain.

15. The method according to claim 12, wherein when the PPDU frame is transmitted in a Multi User-Multiple Input Multiple Output (MIMO) mode or an Orthogonal Frequency Division Multiple Access (OFDMA) mode, a starting point of the HE-LTF section for each of the plurality of subchannels is equal across the plurality of subchannels and an end point of the HE-LTF section for each of the plurality of subchannels is equal across the plurality of subchannels.

16. The method according to claim 12, wherein Orthogonal Frequency Division Multiplexing (OFDM) symbol duration applied to the HE-LTF sections of each of the plurality of subchannels is equal across the plurality of subchannels, and a Guard Interval (GI) applied to the HE-LTF sections of each of the plurality of subchannels is equal across the plurality of subchannels.

17. The method according to claim 11, wherein the plurality of subchannels are defined on a plurality of channels, each channel having a 20 MHz bandwidth.

18. The method according to claim 17, wherein each of the plurality of subchannels subchannel is allocated without crossing a boundary between channels of the plurality of channels.

19. The method of claim 11,
- wherein the number of the plurality of HE-LTF elements is equal to two when the maximum value is two;
- wherein the number of the plurality of HE-LTF elements is equal to four when the maximum value is three or four;
- wherein the number of the plurality of HE-LTF elements is equal to six when the maximum value is five or six; and
- wherein the number of the plurality of HE-LTF elements is equal to eight when the maximum value is seven or eight.

* * * * *